United States Patent [19]

Ikeda

[11] Patent Number: 5,767,990
[45] Date of Patent: Jun. 16, 1998

[54] ILLUMINATION DEVICE FOR FILM IMAGE SCANNING DEVICE

[75] Inventor: Osamu Ikeda, Kanagawa-ken, Japan

[73] Assignee: Nikon Corporation, Tokyo, Japan

[21] Appl. No.: 561,467

[22] Filed: Nov. 21, 1995

[30] Foreign Application Priority Data

Feb. 24, 1995 [JP] Japan .................... 7-036377

[51] Int. Cl.$^6$ .................................. H04N 1/04
[52] U.S. Cl. ............................ 358/475; 358/487
[58] Field of Search ...................... 358/475, 474, 358/471, 487, 505, 515; 355/45, 55, 67, 69; 362/257, 314, 296, 297, 311; 359/562, 558, 619, 201, 202, 205, 214

[56] References Cited

U.S. PATENT DOCUMENTS

| | | | |
|---|---|---|---|
| 5,168,377 | 12/1992 | Nagano | 358/471 |
| 5,191,406 | 3/1993 | Brandestini et al. | 358/515 |
| 5,196,950 | 3/1993 | Fukuda et al. | 358/475 |
| 5,241,406 | 8/1993 | Johnston et al. | 358/475 |
| 5,313,289 | 5/1994 | Nagane et al. | 358/475 |
| 5,381,245 | 1/1995 | Johnston et al. | 358/475 |
| 5,499,112 | 3/1996 | Kawai et al. | 358/475 |
| 5,566,006 | 10/1996 | Yoshinaga et al. | 358/475 |

Primary Examiner—Edward L. Coles, Sr.
Assistant Examiner—Fan Lee
Attorney, Agent, or Firm—Oliff & Berridge

[57] ABSTRACT

An illumination device for a film image scanning device is provided. The illumination device is small in size compared to a size of the image to be scanned. Light emitted by a point light source at one end of the image scanning device is reflected back toward the point light source by first and second mirrors at an opposite end of the image scanning device. A third mirror reflects the light to a pair of condenser lenses that evenly transmit the light toward a film slide to be scanned. The light passes through one of the condenser lenses perpendicular to an optical axis of the condenser lens, thereby making the image scanning device compact. Fresnel lenses are also provided as condenser lenses.

18 Claims, 7 Drawing Sheets

ILLUMINATION DEVICE FOR FILM IMAGE SCANNING DEVICE

BACKGROUND OF THE INVENTION

1. Field of the Invention

In general, this invention relates to a film image scanning device for scanning an image in a semi-transparent film. In particular, this invention relates to a device for illuminating a film having an image to be scanned.

2. Description of Related Art

Devices for scanning an image on a sem-itransparent film, such as a 35 mm film slide, are used to convert the image on the film to an electronic signal. Once the image is converted into an electronic signal, a host computer, for example, can display, print, store or otherwise process the image.

Figure 1:
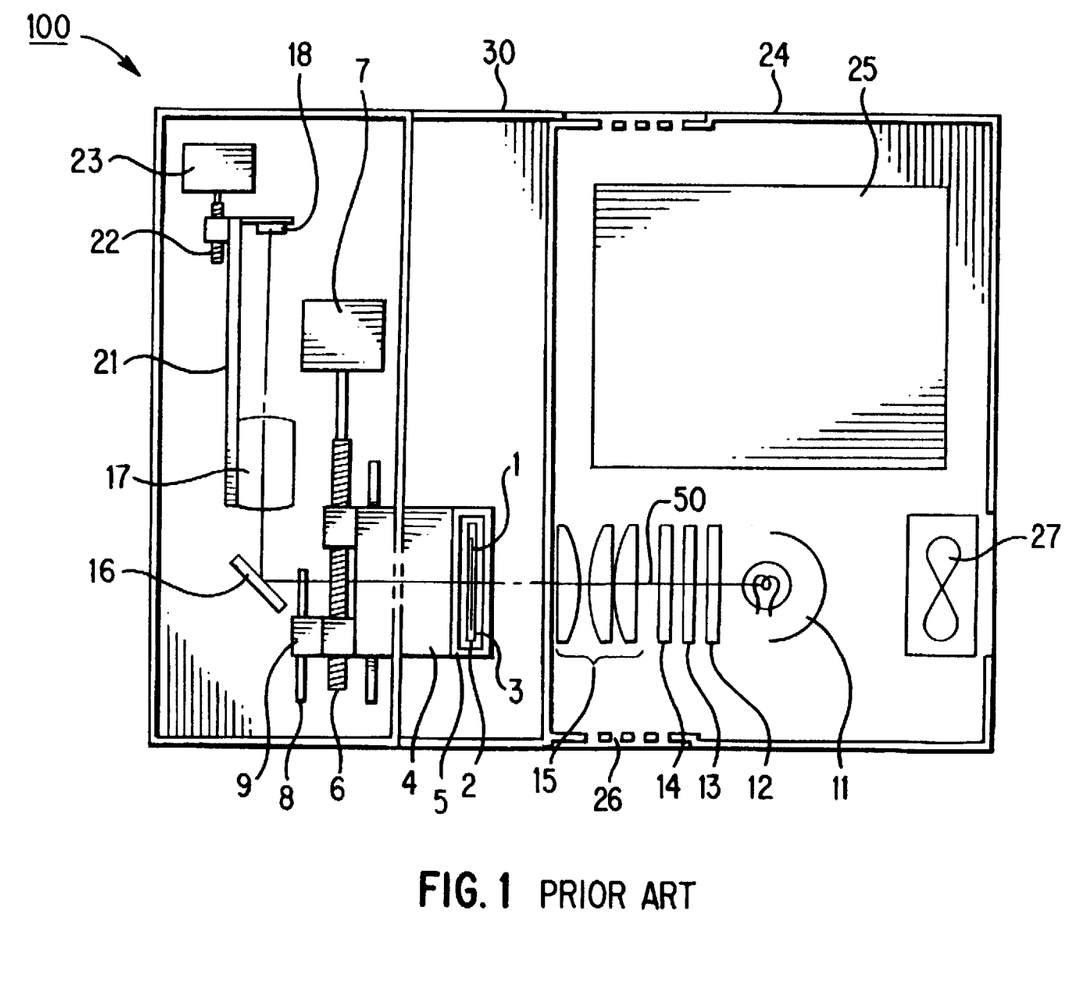
FIG. 1 is a schematic top sectional view of a conventional image scanning device.

FIG. 1 shows a conventional image scanning device 100 for converting an image on a film slide to an electronic signal representing the image. The image scanning device 100 is contained within a case 24 and has a power supply 25 and an exhaust fan 27. A film slide 2 is formed of film 1 mounted to a frame 3. The film slide 2 is secured to a holder 5 by a plate spring (not shown). The holder is fixed to a stage 4.

The film 1 is illuminated by light 50 emitted from a light source 11, e.g. a halogen lamp. Heat generated by the light source 11 and the power supply 25 is dissipated by the exhaust fan 27 which draws air through an air intake 26. The light 50 passes through a heat absorbing filter 12, a diffusion plate 13, a color filter unit 14 and a condenser lens unit 15 before reaching the film 1. Different color filters in the color filter unit 14 are used during scanning to generate an electronic signal which is a color representation of the image on the film 1.

Light passing through the film 1 is reflected by a mirror 16 and passes through a lens 17 before reaching a linear charge-coupled device sensor array (CCD) 18. The CCD 18 photoelectrically converts the light 50 into an electronic image signal representing the image on the film 1. The image signal is output to an image processor (not shown), such as a host computer.

The lens 17 and the CCD 18 are both fixed to a support member 21. A focus motor 23 drives a lead screw 22, thereby moving the lens 17, the CCD 18 and the support member 21. By moving the lens 17 and the CCD 18, the light 50 is properly focussed on the CCD 18.

Since the light 50 only illuminates a small portion of the film 1 and the CCD 18 is a linear array, the film 1 is moved relative to the light 50 so all portions of the film 1 are scanned. The film 1 is moved by moving the stage 4 in a direction perpendicular to the direction of propagation of the light 50. The stage 4 is moved by a stage motor 7 turning a lead screw 6. The lead screw 6 engages with a threaded hole in the stage 4. A guide element 9 fixed to the stage 4 slides along a guide bar 8 and ensures correct positioning of the stage 4.

The image processor controls the operation of the image scanning device 100 when a film 1 is scanned. For example, during scanning the image processor coordinates the focussing of the light 50 on the CCD 18, moving the stage 4 and the film 1, inputting the image signal from the CCD 18, calculating image contrast, adjusting the light 50 intensity and the CCD 18 accumulation time, and calculating and storing a scanning range setting.

To scan an image on a film 1, the image processor controls the image scanning device to position the film 1 at a first position and illuminates a portion of the film 1. Each element within the CCD 18 generates an electronic signal in response to the amount of light which passes through the film 1 and strikes the element. The image processor then detects and stores the signals generated by each element in the CCD 18 in a manner well known in the art.

When the signals from all elements in the CCD 18 are detected, the image processor controls the image scanning device to move the film 1 to a second position and illuminates a next portion of the film 1. The signals from the CCD 18 are again detected and stored and the image processor repeats this process until the entire film 1 is scanned.

Figure 2:
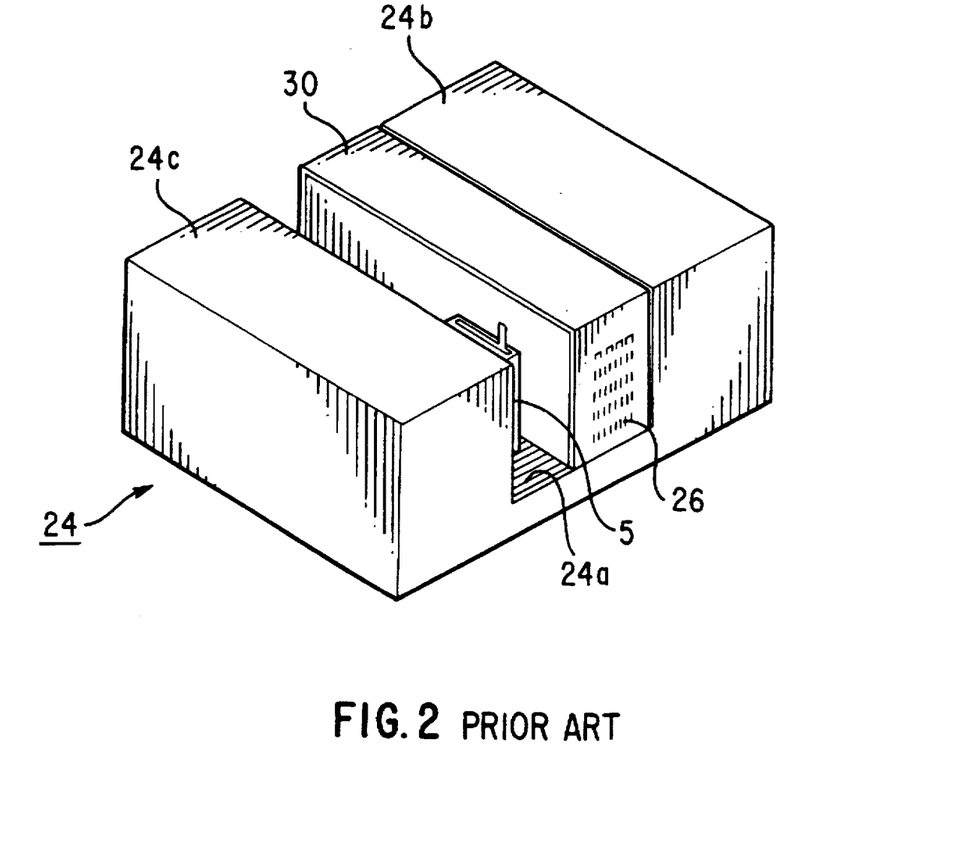
FIG. 2 is a side perspective view of the device of FIG. 1.

FIG. 2 shows the case 24 containing the image scanning device 100. A first portion 24a of the case 24 is configured to allow mounting film slides 2 on the stage 4 and movement of the stage 4. The first portion 24a is closed by manually sliding a cover 30 over the first portion 24a when film slides 2 are scanned. Closing the first portion 24a prevents ambient light from interfering with scanning a film slide 2. FIG. 1 shows the cover 30 in the closed position and FIG. 2 shows the cover in the open position.

A second portion 24b of the case 24 contains the light source 11, the heat absorbing filter 12, the diffusion plate 13, the color filter unit 14, the condenser lens unit 15, and the power source 25. A third portion 24c of the case 24 contains the mirror 16, the lens 17, the CCD 18 and the drive components for the stage 4 and the CCD 18 described above.

Conventional image scanning devices, such as the one described above, must have a sufficiently long distance between the light source and the film. A proper distance between the light source and the film ensures uniform illumination of a desired area on the film. In general, the distance between the light source and the film increases as the size of the image on the film increases.

When scanning large original images, conventional image scanning devices require a condenser lens larger than the original image scanning range, and therefore require a relatively long distance separating the light source from the original image. As a result, conventional image scanning devices are made relatively large, so the image scanning device can properly scan large original images.

SUMMARY OF THE INVENTION

Therefore, a primary object of this invention is to provide an illuminating device for an image scanning device that is relatively small in size in relation to the size of the image scanned.

This invention is provided by increasing the optical path length of light emanating from a point light source without enlarging the image scanning device, especially in a direction of an optical axis of a condenser lens. Light from the point light source is reflected by a plurality of reflecting devices so the light travels a sufficiently long distance before reaching the condenser lens.

This invention provides an image scanning device in which light emitted from a point light source first passes through a condenser lens perpendicular to the condenser lens' optical axis before passing through the condenser lens parallel to the condenser lens' optical axis. This allows the image scanning device to be compact in a direction parallel to the condenser lens' optical axis.

The invention also provides an improved illumination device in an image scanning device which uses a Fresnel condenser lens in place of the conventional convex-plano condenser lens. Use of the Fresnel condenser lens allows the image scanning device to be made more compact than is possible with a convex-plano condenser lens.

BRIEF DESCRIPTION OF THE DRAWINGS

The invention will be described in reference to the following drawings, in which like reference numerals indicate like elements and wherein.

DETAILED DESCRIPTION OF PREFERRED EMBODIMENTS

Figure 3:
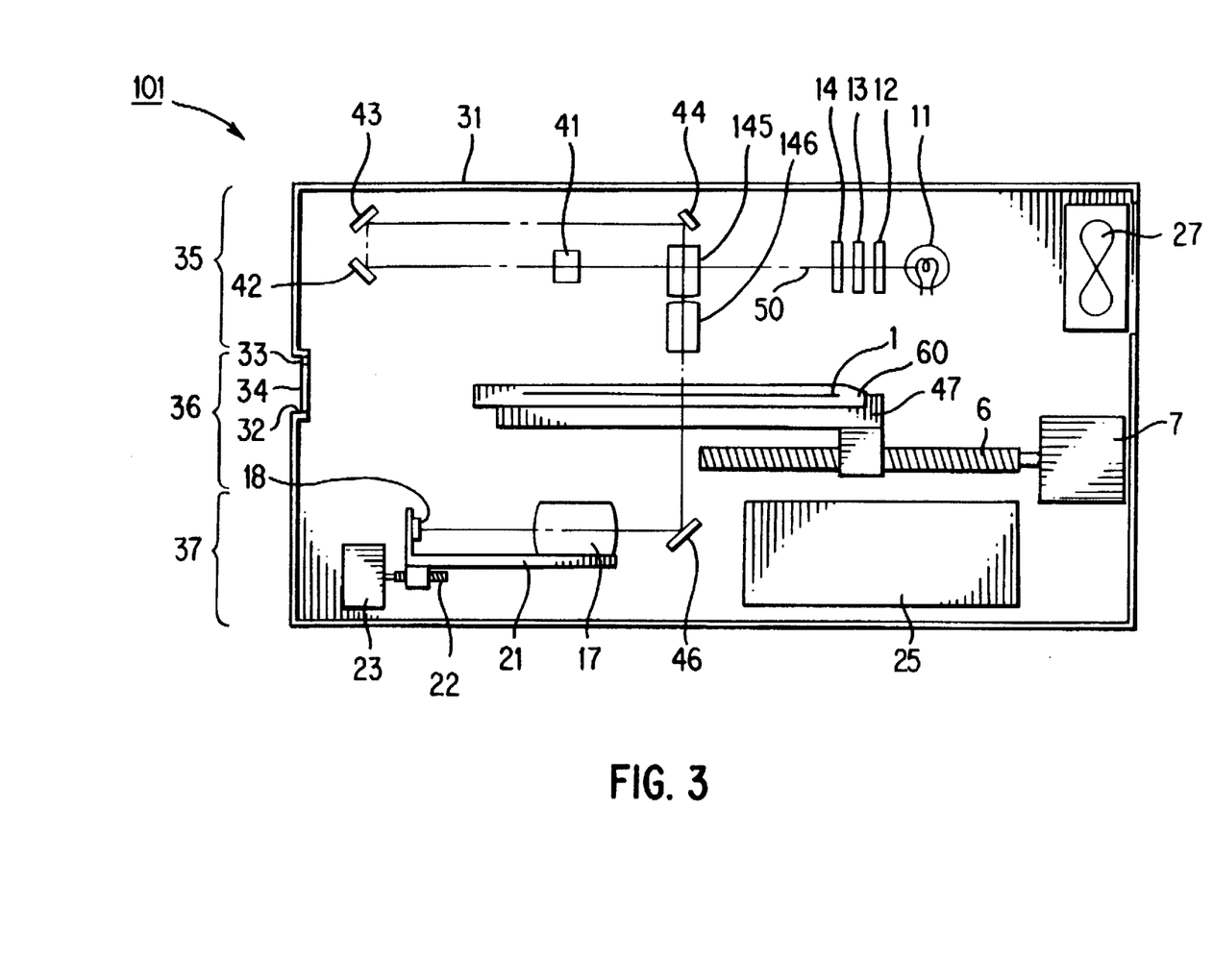
FIG. 3 shows a schematic side view of an image scanning device in a first embodiment of the invention.

FIG. 3 shows a first embodiment of an image scanning device 101 of the invention for scanning an image on a film 1. The image scanning device 101 is contained in a case 31 which has three sections, an illumination section 35, a film drive section 36 and an image scanning section 37.

The illuminating section 35 has a point light source 11 which emits light 50. The point light source 11 is preferably a halogen lamp, but can be one of many different types of light sources. An exhaust fan 27 removes waste heat generated by the point light source 11 and a power supply 25. Light 50 from the point light source 11 passes through a heat absorbing filter 12, a diffusion plate 13 and a color filter unit 14.

Color filter unit 14 includes filters of different colors, such as red, green and blue, are preferably used when an image is scanned. For example, an entire image on the film 1 is first scanned using a red color filter. Then the image is scanned using a green color filter and a blue color filter. Scanning with three different color filters allows the image scanning device 101 to generate a signal which is a color representation of the image. The image can also be scanned without using a color filter unit 14.

After passing through the color filter unit 14, the light 50 passes through a condenser lens 145 perpendicular to the condenser lens' 145 optical axis. The light 50 passes through the condenser lens 145 so the light 50 is not deflected or deviated in its direction.

After next passing through a condenser lens 41, the light 50 is reflected by a first mirror 42, a second mirror 43 and a third mirror 44. The third mirror 44 directs the light 50 toward the second condenser lens 145 and a third condenser lens 146. The first, second and third condenser lenses 41, 145 and 146 cooperate to collimate individual light rays comprising the light 50 and provide uniform illumination of the film 1.

Light 50 passing through the third condenser lens 146 enters the film drive section 36 and illuminates the film 1, which is mounted on a film holder 60. The film holder 60 is supported by a stage 47. The stage 47 is driven in a direction perpendicular to the light 50 striking the film 1 by a lead screw 6 and a stage motor 7. Since the light 50 illuminates only a small portion of the film 1, the film 1 must be moved perpendicularly relative to the light 50 to scan the entire film 1. The direction the stage 47 is driven by the stage motor 7 is the subscanning direction.

The film holder 60 is inserted into and removed from the case 31 through an insertion hole 32 formed in the case 31. A door 34, rotatably mounted to a shaft 33, opens to allow insertion and removal of the film holder 60 and closes during film 1 scanning to block ambient light from entering the case 31. The door 34 can be opened or closed by a variety of methods, including but not limited to gravity, a coil spring, torsion spring or flat spring biasing the door 34 closed or a motor and solenoid.

Light 50 passing through the film 1 enters the image scanning section 37. The light 50 is reflected by a fourth mirror 46 and passes through a lens 17, striking a charge-coupled device sensor array (CCD) 18. The CCD 18 can be either a linear array or a two dimensional area array. Typically, the CCD 18 is not as large in area as the image on the film 1 to be scanned. Therefore, only a thin rectangular portion of the film 1 can be scanned in the main scanning direction by the CCD 18 at a time. After one portion of the film 1 is scanned by the CCD 18 in the main scanning direction, the film 1 is moved by the stage 47 in the sub-scanning direction and the next portion of the film 1 is scanned by the CCD 18.

The lens 17 and the CCD 18 are mounted to a support member 21 which is driven by a lead screw 22 and a focus drive 23. The focus drive 23 and lead screw 22 move the support member 21 to properly focus the light 50 on the CCD 18.

Figure 4:
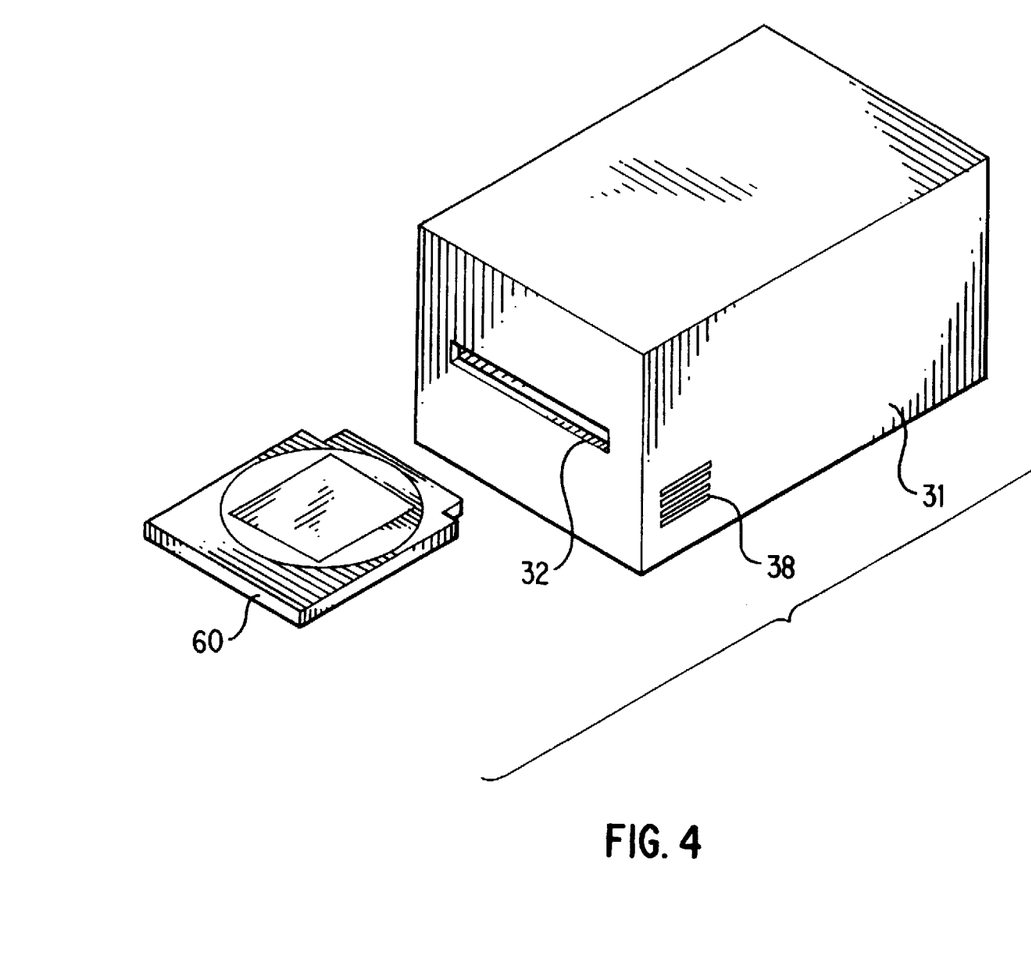
FIG. 4 shows a perspective view of a case containing the image scanning device of the invention.

FIG. 4 shows a perspective view of the image scanning device 101. The case 31 has an air intake 38 which is located near the CCD 18. This ensures that the CCD 18 maintains a constant temperature as the exhaust fan 27 draws cool air in the air intake 38. The film holder 60 is inserted into the insertion hole 32.

Figure 5:
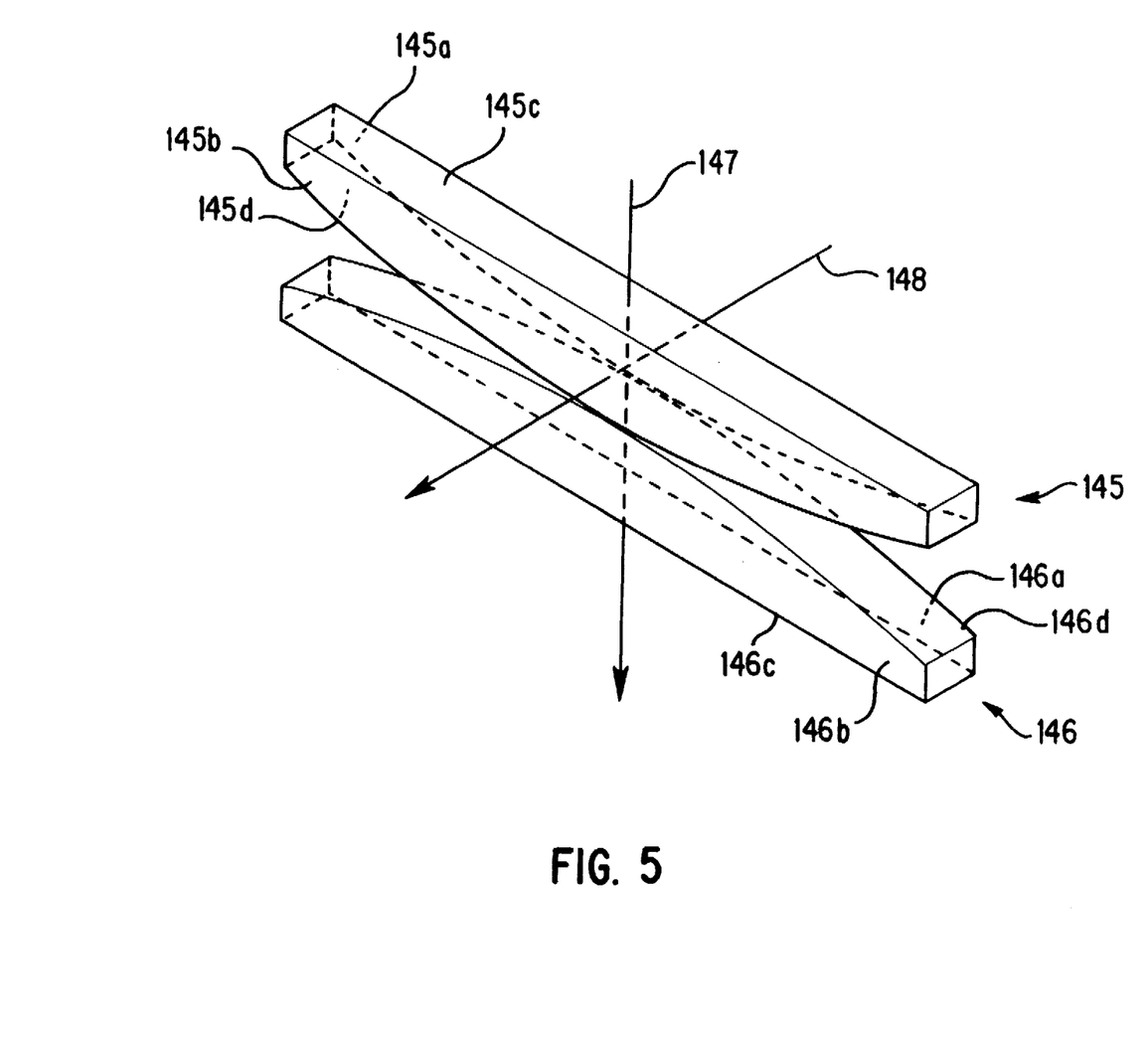
FIG. 5 shows a perspective view of a condenser lens unit having convex-plano lenses used in the image scanning device in the first embodiment of the invention.

FIG. 5 shows the second and third condenser lenses 145 and 146. The second and third condenser lenses 145 and 146 are preferably convex-plano lenses which are shaped to provide uniform illumination of the film 1. Convex faces 145d and 146d of the second and third condenser lenses 145 and 146 face each other to correct for chromatic aberration. Faces 145c and 146c are parallel to each other, and the second and third condenser lenses 145 and 146 are aligned to ensure that the second and third condenser lenses 145 and 146 have a common optical axis 147. Faces 145a, 145b, 146a and 146b are parallel to each other and to the optical axis 147.

Light 50 from the third mirror 44 passes through the second and third condenser lenses 145 and 146 toward the film 1 in a direction parallel to the optical axis 147. The second and third condenser lenses 145 and 146 have a width in a direction 148 perpendicular to the optical axis 147 which corresponds to the width of the CCD 18.

To provide the smallest possible image scanning device 101 while maintaining a sufficiently long optical path for the light 50, the light 50 from the color filter unit 14 passes through the second condenser lens 145 in the direction 148 perpendicular to the optical axis 147. Since the light 50 from the color filter unit 14 enters the second condenser lens 145 perpendicular to the face 145a, the light 50 is not deflected from its original path. This makes the image scanning device 101 as compact as possible in a direction parallel to the optical axis 147.

Figure 6:
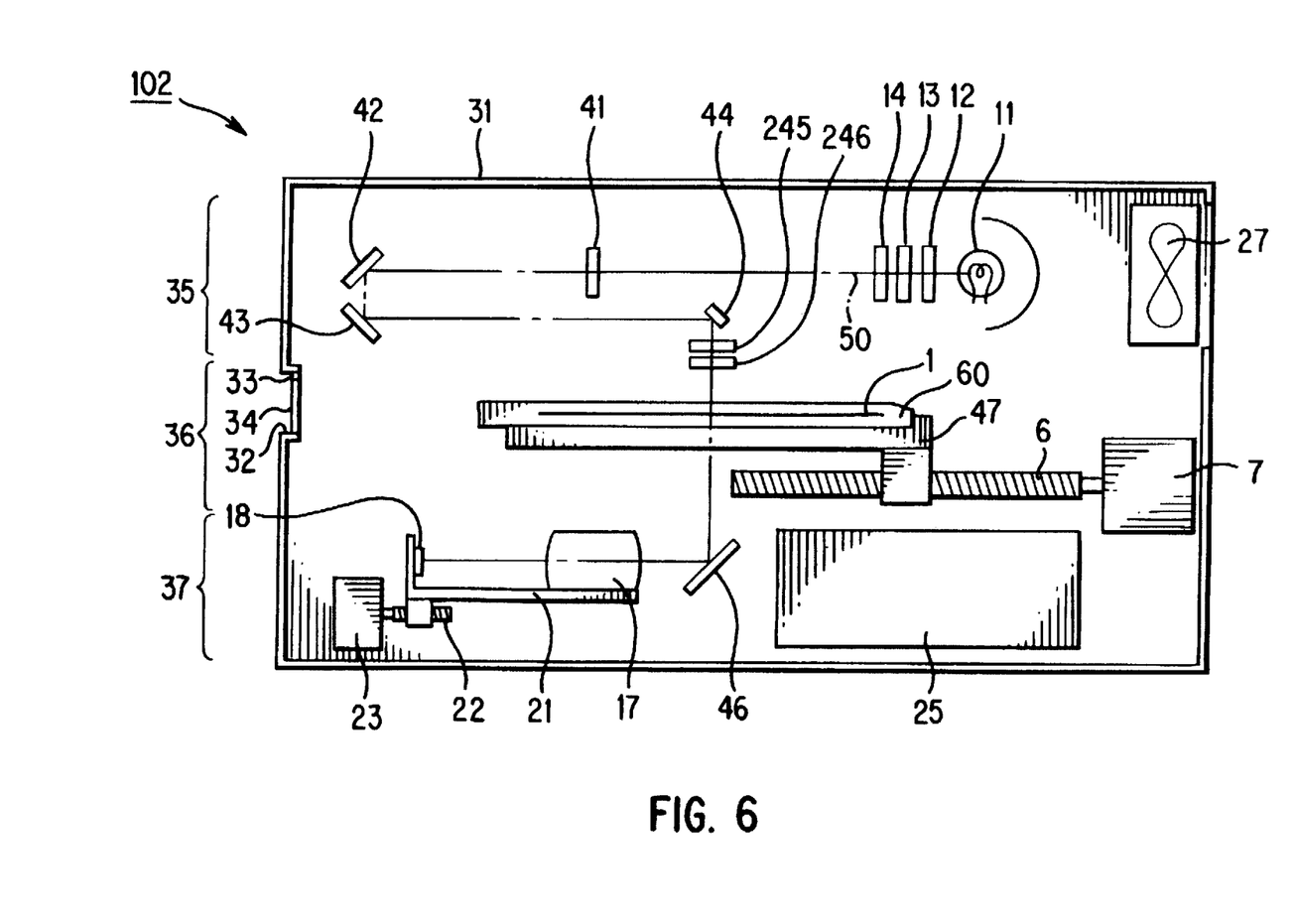
FIG. 6 shows a schematic side view of an image scanning device in a second embodiment of the invention.

FIG. 6 shows a second embodiment of an image scanning device 102 of the invention. This image scanning device 102 has three sections, an illumination section 35, a film drive section 36 and an image scanning section 37, similar to the image scanning device 101 in the first embodiment of the invention. The film drive section 36 and the image scanning section 37 in the image scanning device 102 of the second embodiment of the invention are identical to the film drive section 36 and the image scanning section 37 in the image scanning device 101 of the first embodiment of the invention.

The illumination section 35 in the image scanning device 102 is similar to the illumination section 35 in the image scanning device 101 in the first embodiment of the invention. However, in the image scanning device 102 in the second embodiment, the light 50 is reflected along a different optical path than that described above with respect to the image scanning device 101 in the first embodiment of the invention. The image scanning device 102 in the second embodiment uses Fresnel lenses as the second and third condenser lenses 245 and 246 in place of the convex-plano lenses used in the first embodiment.

Figure 7:
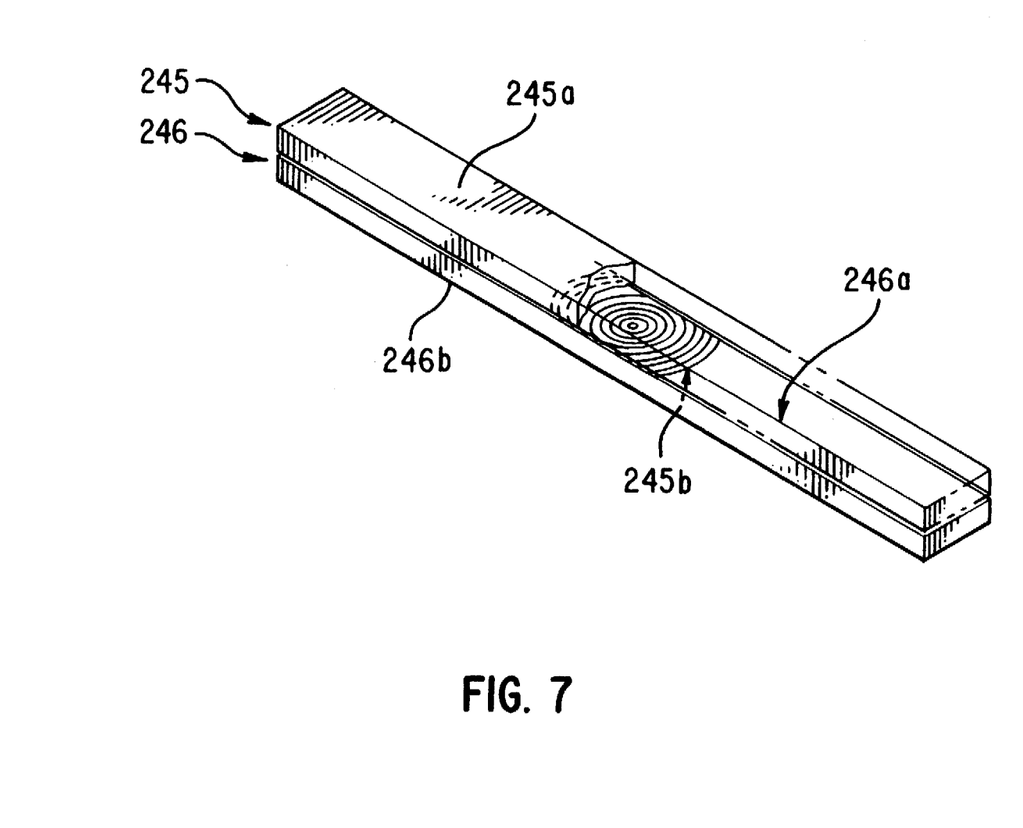
FIG. 7 is a perspective view of a condenser lens unit having Fresnel lenses used in the image scanning device of the second embodiment of the invention.

FIG. 7 shows a perspective view of the second and third condenser lenses 245 and 246. The second and third condenser lenses 245 and 246 are rectangular in shape. The light 50 reflected by the third mirror 44 enters an incidence face 245a of the second condenser lens 245 and passes through to an ejection face 245b. The incidence face 245a of the second condenser lens 245 is flat. The ejection face 245b of the second condenser lens 245 is patterned to have a set of spherical convex surfaces in concentric circles typical in Fresnel lenses.

After passing through the ejection face 245b in the second condenser lens 245, the light 50 enters the incidence face 246a of the third condenser lens 246 and passes through to the ejection face 246b. The incidence face 246a is patterned similarly to the ejection face 245b of the second condenser lens 245. The ejection face 246b of the third condenser lens 246 is flat.

The second and third Fresnel condenser lenses 245 and 246 are thinner than the convex-plano lenses used in the first embodiment of the invention. Therefore, the image scanning device 102 can be made smaller and still maintain the proper optical path length for the light 50 without requiring the light 50 to pass through the second condenser lens 245 perpendicular to the optical axis 147 as with the image scanning device 101 in the first embodiment of the invention.

While this invention has been described in relation to the preferred embodiments, it should be understood that it is not intended to limit the invention to these embodiments. On the contrary, it is intended to cover all alternatives, modifications and equivalents that may be included within the spirit and scope of the invention as defined by the appended claims.

What is claimed is:

1. An image scanning device having a first end and a second end opposite to the first end aligned in a longitudinal direction, the image scanning device comprising:

a point light source positioned at the first end, the point light source emitting light in the longitudinal direction toward the second end;

a first set of mirrors positioned at the second end reflecting the in the longitudinal direction toward the first end;

a second mirror reflecting the light from the first set of mirrors in a second direction to the longitudinal direction; and at least one condenser lens for evenly transmitting the light reflected by the second mirror toward an image to be scanned.

2. The image scanning device of claim 1, wherein the condenser lens has a primary face and an optical axis, the primary face being parallel to the optical axis, wherein the light emitted by the point light source passes through the primary face.

3. The image scanning device of claim 2, further comprising a photoelectric conversion device having a main scanning direction that receives light passing through the image to be scanned and is positioned perpendicular to the longitudinal direction.

4. The image scanning device of claim 3, wherein the light received by the photoelectric conversion device is directed in the longitudinal direction.

5. The image scanning device of claim 3, wherein the first set of mirrors, the second mirror and the at least one condenser lens each have a longitudinal axis and are positioned so that the longitudinal axes are parallel to the main scanning direction of the photoelectric conversion device.

6. The image scanning device of claim 3, wherein the at least one condenser lens comprises a pair of Fresnel condenser lenses.

7. The image scanning device of claim 6, wherein the first set of mirrors, the second mirror and the at least one condenser lens each have a longitudinal axis and are positioned so that the longitudinal axes are parallel to the main scanning-direction of the photoelectric conversion device.

8. The image scanning device of claim 1, wherein the at least one condenser lens comprises a pair of convex-plano condenser lenses.

9. The image scanning device of claim 1, wherein the at least one condenser lens comprises a pair of Fresnel condenser lenses.

10. The image scanning device of claim 1, further comprising a photoelectric conversion device having a main scanning direction that receives light passing through the image to be scanned and is positioned perpendicular to the longitudinal direction.

11. The image scanning device of claim 1, further comprising an exhaust assembly located near the point light source for removing waste heat produced by the point light source.

12. An image scanning device comprising:

point light source means for emitting light;

reflecting means for receiving the emitted light, the reflecting means directing the light to follow an optical path of a predetermined length; and lens means for evenly transmitting light received from the reflecting means toward an image to be scanned, wherein the optical path is sufficiently long to ensure the light transmitted toward the image to be scanned is collimated and uniform in intensity, and wherein the light initially emitted by the point light source means passes through the lens means in a direction transverse to an optical axis of the lens means.

13. The image scanning device of claim 12, wherein the reflecting means comprises a first reflecting assembly positioned opposite to the point light source means reflecting light toward the point light source means and a second reflecting assembly positioned generally between the first reflecting assembly and the point light source means reflecting light perpendicular to the light emitted from the point light source means to the lens means.

14. The image scanning device of claim 12, wherein the lens means comprises a plurality of convex-plano lenses.

15. The image scanning device of claim 12, wherein the lens means comprises a plurality of Fresnel lenses.

16. The image scanning device of claim 12, further comprising waste heat removal means located near the point light source means for removing waste heat produced by the point light source means.

17. The image scanning device of claim 12, further comprising a conversion means for receiving light passing through the image to be scanned and converting the received light into a signal representing the image.

18. The image scanning device of claim 17, wherein the conversion means has a main scanning direction that is perpendicular to an optical axis of the lens means.

* * * * *